United States Patent Office 2,890,253
Patented June 9, 1959

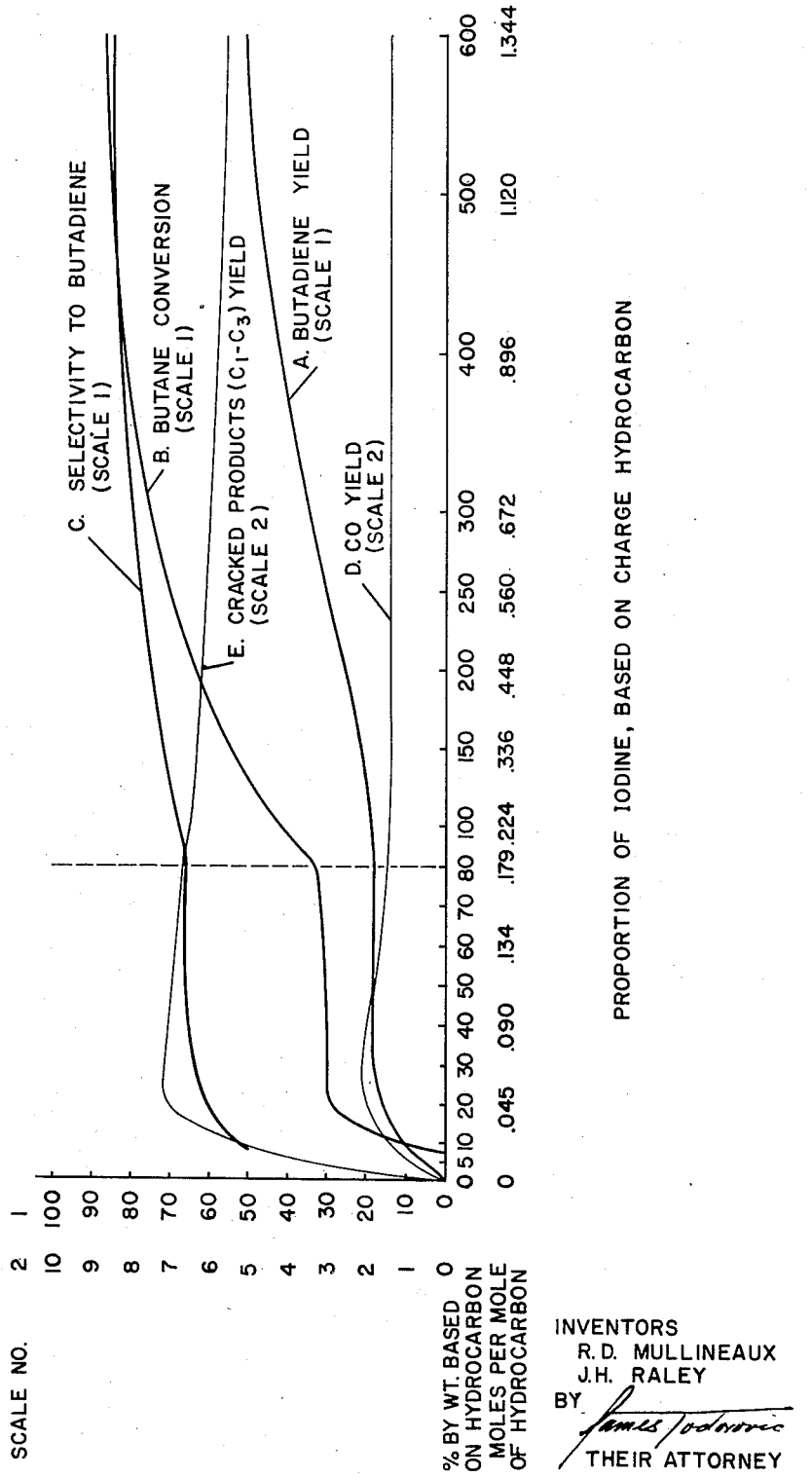

2,890,253

DEHYDROGENATION PROCESS

Richard D. Mullineaux, Oakland, and John H. Raley, Walnut Creek, Calif., assignors to Shell Development Company, New York, N.Y., a corporation of Delaware Application May 16, 1956, Serial No. 585,323

12 Claims. (Cl. 260—673.5)

This invention relates to an improved process for the conversion of organic compounds. It relates more particularly to an improvement in the conversion of certain hydrocarbons to less saturated hydrocarbons.

It is the principal object of this invention to provide an improved process for the conversion of hydrocarbons to different hydrocarbons having a higher carbon-to-hydrogen ratio. Specific objects of this invention are: to dehydrogenate certain aliphatic saturated hydrocarbons to aliphatic unsaturated compounds, especially olefins and diolefins; to dehydrocyclize other aliphatic hydrocarbons to aromatic hydrocarbons and their corresponding aromatic derivatives; to dehydrogenate alicyclic saturated hydrocarbons to cyclic olefins and aromatics; and to couple certain hydrocarbons to compounds having twice the number of carbon atoms per molecule and a higher carbon-to-hydrogen ratio. These objects will be more fully understood and others will become apparent from the description of the invention.

The invention is described with reference being made to the accompanying drawing, the sole figure of which is a graphic representation of the effect of varying amounts of iodine in the charge on the conversion of butane and butene-1 to butadiene-1,3 and other compounds.

It has long been known that small amounts of iodine, from traces to a few percent by weight, promote the cracking of hydrocarbons at elevated temperatures. It has also been proposed to use small amounts of iodine, specifically from 0.5% to 5% by weight based on organic feed compound, as a catalyst in the dehydrogenation of certain unsaturated organic compounds by elemental oxygen.

Recently it has been found by one of the present inventors that certain hydrocarbons can be dehydrogenated, others dehydrocyclized, others dehydroisomerized, and others dehydrocoupled in very efficient and selective manner by maintaining a mixture of the feed compound and a reactive proportion of iodine at an elevated temperature above 300° C. for a brief period. In these conversions of hydrocarbons in the presence of a reactive proportion of free iodine, carbon-to-hydrogen bonds are broken with the formation of a molecule of hydrogen iodide from each atom of hydrogen.

In reactions in which elemental iodine is a reagent rather than a catalyst the extent of conversion of the iodine-reactive feed compound to the product is limited by the proportion of elemental iodine with which it comes into contact. For example, in reactions which are not equilibrium-limited, such as the conversion of n-hexane to benzene, one atom of iodine must contact the charge for each atom of hydrogen to be removed. In reactions which are equilibrium-limited, such as the conversion of n-butane to butenes and butadiene, more than one atom of iodine must be present in the charge for each atom of hydrogen to be removed because the ultimate product mixture represents a state in which elemental iodine, hydrogen iodide, feed and product compounds are present in equilibrium.

It has now been found that, in reactions in which iodine is the reagent for converting an iodine-reactive hydrocarbon to a product having a higher carbon-to-hydrogen ratio, the amount of elemental iodine which must be added to obtain a desired degree of conversion can be substantially reduced by adding a controlled amount of free oxygen to the reaction mixture to regenerate elemental iodine from hydrogen iodide. The resulting iodine serves to convert additional portions of the feed compound to product having a higher carbon-to-hydrogen ratio.

In reactions which are equilibrium-limited, the addition of oxygen serves the further purpose of displacing the equilibrium in favor of the organic product compound because hydrogen iodide, which is one of the reaction products, is removed and elemental iodine, which is one of the reactants, is regenerated.

It has been found that, under the conditions of the present invention, the reaction of oxygen and hydrogen iodide is relatively fast compared to the reaction of oxygen with the hydrocarbons present in the reaction mixture when a substantial amount of hydrogen iodide is present. Because of this difference in rates, the selectivity of the conversion of oxygen to form water by reaction with hydrogen iodide is generally very high.

It has also been found that the reaction of elemental iodine with iodine-reactive hydrocarbons is substantially faster than the reaction of oxygen with the same compounds. The formation of hydrogen iodide from elemental iodine and iodine-reactive hydrocarbons is therefore relatively rapid compared to the reaction of oxygen with the same compounds. As a consequence, it is possible to maintain the selectivity of the conversion of oxygen by reaction with hydrogen iodide even when little or no hydrogen iodide is originally present in the mixture provided there is a substantial amount of iodine present.

The foregoing findings may be summarized as follows:

When a substantial proportion of active iodine species, either $I_2$ or HI or a compound that liberates iodine at reaction conditions is present in admixture with iodine-reactive hydrocarbons, then the presence of a limited amount of oxygen in the mixture under reaction conditions results in a selective reaction between oxygen and hydrogen iodide, thus increasing the amount of elemental iodine available for converting the iodine-reactive feed compound.

It has also been found that when elemental iodine, oxygen, and an iodine-reactive feed hydrocarbon are simultaneously present in a mixture flowing through a reaction zone at an elevated temperature of, say, 550° C., the nature of the reaction changes completely as the proportion of elemental iodine is increased from very small concentrations (i.e. catalytic amounts) up to the reactive concentrations employed in the present invention. Thus, with traces or very small amounts of iodine present, certain iodine-reactive compounds, e.g. saturated hydrocarbons such as n-butane or n-hexane, are not attacked at all at relatively short contact times, e.g. up to one or two seconds. Other compounds, e.g. unsaturated hydrocarbons such as butylene, are converted in what appears to be an iodine-catalyzed oxidation and oxidative dehydrogenation. As the proportion of iodine added is increased it suppresses the attack of oxygen on the hydrocarbon; the conversion of iodine-reactive feed to product compound then becomes proportional to the amount of elemental iodine which is originally present in the reaction mixture plus that which is regenerated from hydrogen iodide by reaction of the latter with elemental oxygen.

Under the conditions of temperature, pressure and residence time useful in the present invention, but in the absence of substantial amounts of iodine species, the attack of oxygen on organic compounds susceptible to reaction results in a relatively non-selective overall reaction. A portion of the feed compound may be dehydrogenated while other portions are converted to partially oxidized products and others to water and oxides of carbon. Cracking of the organic compound also occurs to a substantial extent. By contrast, the conversion of hydrocarbons by reaction with iodine even in the presence of oxygen is generally a highly selective reaction which may and often does result in selectivities of 90% or higher to the desired hydrocarbon products.

The present invention can be carried out by passing a vaporized mixture of the feed compound with at least 0.1 mole of elemental iodine per mole of feed (and generally between 25% and 1000% by weight of $I_2$ based on feed) through a reaction zone maintained at a temperature between 450° and 800° C. A gas containing oxygen, e.g. substantially pure oxygen or air, is added to the reaction mixture at one or more spaced points in the reaction zone in such amounts that the total amount present in the mixture at any injection point does not exceed one molecular weight proportion of oxygen per atomic weight proportion of iodine in all active iodine species present. The nominal residence time of the feed compound in the reaction zone is in the range from 0.01 to 60 seconds. If desired, hydrogen iodide may be injected together with the mixture of feed compound and elemental iodine into the reaction zone.

The ratio of oxygen to iodine is expressed in the foregoing paragraph in terms of molecular weight proportion of oxygen per atomic weight proportion of iodine in all active iodine species. For convenience of reference, this same ratio will be hereafter designated simply "moles of oxygen per atom of iodine." For a ratio of 1:1, this means one gram-mole of oxygen per gram-atomic weight of iodine, counting the iodine in all active species present in the mixture; it is the same as one pound-mole of oxygen per pound-atomic weight of iodine, etc. The "active iodine species" refers to the following compounds in the reaction mixture: $I_2$, HI and compounds which liberate either $I_2$ or HI at reaction conditions.

The temperature maintained in the reaction zone is suitably between 450° and 800° C. It is preferred to maintain a temperature of at least 525° C. The most suitable range in most cases is between 550° and 650° C. The higher temperatuers are not objectionable so long as undesirable changes are not effected. Thus, temperatures up to 700° C. or higher are suitably employed with relatively low molecular weight compounds, e.g., hydrocarbons up to $C_4$. The relatively high temperatures permit, and usually require, the use of contact times not exceeding 1 or 2 seconds.

The process can be carried out at various pressures from subatmospheric to superatmospheric pressure in vapor phase. There is generally no justification for operating at pressures below atmospheric. It is generally desirable, however, to operate at pressures near atmospheric. Increasing pressure shifts the equilibrium between hydrogen iodide and elemental iodine in the system in favor of iodine and therefore reduces the amount of hydrogen iodide available for reaction with oxygen in reactions which are equilibrium limited. Therefore, pressures from 0 to 75 lbs./sq. in. gauge are generally preferred but pressures up to 200 p.s.i.g. may be employed.

The residence time of the reactants at the selected reaction conditions depends upon the particular reactant, the proportion of iodine in the reaction mixture, the temperature and pressure and the nature of the intermediates and product compounds. In general, the nominal residence time should be at least about 0.01 second and usually at least 0.1 second. It should usually not be over about 1 minute but it may in some cases be as much as 3 to 5 minutes but no more. With most common reactants the reaction is very rapid so that a residence time of from 0.1 to 10 seconds suffices and is preferred. Nominal residence time is the calculated length of time during which the feed mixture would be in the reaction zone if the number of moles of product mixture were equal to the number of moles of feed mixture. Since the number of moles of product exceed the moles of feed, the actual residence time is somewhat shorter than the nominal residence time.

The conversion of iodine-reactive hydrocarbons with elemental iodine under the conditions of the present invention is peculiar in that the selectivity of the reaction to the favored compound or compounds is greatly increased as the amount of elemental iodine present in the initial reaction mixture increases. Therefore, even though oxygen is employed to increase the efficiency of utilization of the iodine, the ratio of the actual amount of the iodine charged with the feed to the reaction zone must be at least 0.1 mole of iodine per mole of iodine-reactive hydrocarbon and is preferably at least 0.2 mole of iodine per mole of feed hydrocarbon.

The amount of iodine employed may, for convenience, be expressed in theories. One "theory" is the theoretically required amount of iodine, determined by the stoichiometry of the reaction, to convert one unit of feed compound to the favored product. For example, to convert 1 gram molecular weight of n-hexane to benzene requires 8 gram atomic weights (gram equivalent weights) or 4 gram molecular weights of elemental iodine ($I_2$); 1 theory of iodine in that reaction is, therefore, 4 moles per mole of n-hexane. Similarly, to convert 1 gram molecular weight of n-butane to butadiene requires 4 gram atomic weights or 2 gram molecular weights of elemental iodine; 1 theory of iodine in that reaction is, therefore, 2 moles per mole of n-butane. The number of theories of iodine species charged to the reaction zone in the present invention is suitably in the range from 0.05 to 1.5 and preferably from 0.1 to 0.8 theory.

An advantage of operation in accordance with the present invention is that the use of oxygen permits an increase in the conversion of iodine-reactive hydrocarbons by reaction with iodine when charging an amount of iodine substantially less than one theory. In some cases, however, oxygen is employed to advantage even when charging a theory or more of elemental iodine. Aside from the practical advantage of internally supplying the heat of reaction, the use of oxygen favorably affects the equilibrium of the reaction, e.g. when employing relatively high pressures or low reaction temperatures.

The amount of iodine used in this invention represents a very substantial weight percent of the organic compound charged. To illustrate, Table 1 shows the weight percent of iodine at different iodine-to-hydrocarbon mole ratios for hydrocarbons having 2, 9 and 15 carbon atoms per molecule, respectively; this represents the range of compounds to which the present invention is most generally applicable.

TABLE 1

| Moles I₂/Mole Feed | 0.1 | 0.2 | 0.5 | 1.0 | 2.0 |
|---|---|---|---|---|---|
| Feed: $C_2H_6$; Product: $C_2H_4$— | | | | | |
| Theory | 0.1 | 0.2 | 0.5 | 1.0 | |
| I₂, Percent by weight | 85 | 170 | 424 | 848 | |
| Feed: $C_9H_{20}$; Product: $C_9H_{12}$— | | | | | |
| Theory | | 0.05 | 0.125 | 0.25 | 0.5 |
| I₂, Percent by weight | | 40 | 99 | 198 | 396 |
| Feed: $C_{15}H_{32}$ Product $C_{15}H_{24}$— | | | | | |
| Theory | | 0.05 | 0.125 | 0.25 | 0.5 |
| I₂, Percent by weight | | 24 | 60 | 120 | 240 |

It is shown in Table 1 that when converting ethane to ethylene the minimum amount of iodine required to be charged is fixed by the initial concentration of 0.1 mole per mole of feed and is 85% by weight based on the ethane. When converting a paraffin hydrocarbon to the corresponding monocyclic aromatic, it is desirable to add at least 0.05 theory of iodine, which is 0.2 mole per mole of feed; this amounts to 40% by weight, based on a C₉ compound and 24% by weight, based on a C₁₅ compound.

When at least 0.1 mole of iodine, and preferably more, is present per mole of iodine-reactive hydrocarbon feed under the reaction conditions stated, there is no lower limit of chemical significance to the amount of oxygen employed in the present invention. In order to obtain a substantial improvement in the efficiency of utilization of iodine it is, however, desirable to add at least 0.1 mole of oxygen per atom of iodine in any active iodine species present in the charge during the course of the reaction. The maximum amount of oxygen which can be added at any one point without substantially altering the nature of the reaction is related to the amount of active iodine species present because the iodine serves to inhibit the attack of oxygen on the iodine-reactive hydrocarbon feed compounds, although the nature of this inhibition is not clearly understood. It has been found that generally the amount of free oxygen present in the reaction mixture should not exceed 1 mole of oxygen per atom of iodine (in any active iodine species) present in the mixture. When this ratio is exceeded, the oxygen is likely to attack the hydrocarbon feed compound to a substantial degree. Since this results in a highly exothermic reaction it is possible for the total reaction to go out of control, with substantial rises in temperature and conversion of the feed compounds to combustion products, mainly carbon monoxide, carbon dioxide and water. It is preferred to inject oxygen into the reaction mixture in such a manner that the amount of oxygen in the mixture at the point of injection is in the range between 0.025 and 0.4 mole of oxygen per atom of iodine (in any active iodine species) present when the charge compound is to be converted into an olefinic or diolefinic product. When the charge compound is to be dehydrocyclized to form an aromatic product the ratio of oxygen to iodine in the mixture is preferably kept between 0.025 and 0.5 mole per atom immediately after addition.

The present process is most suitably carried out by passing a vaporized mixture of iodine-reactive feed hydrocarbon and elemental iodine in the ratio previously stated through an unobstructed elongated reaction zone as a flowing stream and injecting into this stream elemental oxygen, either as oxygen gas or diluted, such as air, at one or more injection points. It is best to add the major amount of oxygen to be used at points in the reaction zone at which hydrogen iodide is present in the reaction mixture, either as a result of reaction of elemental iodine with iodine-reactive compound or as a result of hydrogen iodide having been added to the reaction mixture.

Several factors have to be balanced in the choice of oxygen injection points. In order to obtain maximum utilization of oxygen, it is desirable to use the least number of injection points possible without exceeding the permissible oxygen concentration in the mixture. Thus, for a given nominal residence time for iodine and feed organic compound more oxygen is reacted if it is added at one injection point at or near the reactor inlet than if this same amount in total is put in at several spaced injection points. There is a disadvantage, however, in adding oxygen in stoichiometric excess of the hydrogen iodide present at the addition point in that this favors reaction between oxygen and the charge compound, leading to the formation of undesired reaction and decomposition products. In other words, by proceeding in a manner which favors maximum utilization of oxygen the selectivity of the conversion of iodine-reactive compound may be unfavorably affected. It is generally convenient to inject a minor portion of the oxygen with the initial reactants and the remainder of the oxygen at some 1 to 5 spaced injection points. Oxygen may also be injected throughout the reaction zone, e.g. by means of a perforated pipe concentric with a tubular reactor.

For convenience in working up the products of the reaction it is usually preferable to add no more oxygen than can be substantially completely converted by reaction with hydrogen iodide formed in or added to the reaction zone. The total product mixture leaving the reaction zone in such cases contains little or no elemental oxygen.

The invention is further illustrated by the following examples:

*Example I*

The following runs illustrate the manner in which increasing the proportion of elemental iodine to iodine-reactive feed compound affects the nature of the reaction. Several runs were carried out in which a mixture of vaporized n-hexane and iodine was passed through an empty quartz tube. No oxygen was added in these runs. All runs were carried out at a pressure of about 1 atmosphere and with nominal residence times in the range from 30 to 60 seconds, and at a reaction temperature of 527° C., except that the temperature in run 7 was 497° C. Run 1 was made with no iodine present in the feed and run 2 with a small amount, less than 3% by weight, based on hexane. In run 3 the amount of iodine added was 0.1 mole per mole of hexane. In run 4 the iodine-to-hydrocarbon mole ratio is 0.2, corresponding to 0.05 theory of iodine. This is equal to an overall iodine-to-hydrocarbon ratio of 0.05 theory and is the minimum that should be employed in order to obtain desirable results. The amount of iodine was further increased in succeeding runs. The conditions and results are set out in Table 2.

TABLE 2

| Feed | n-Hexane |
|---|---|
| Pressure, p.s.i.g. | 0 |
| Nominal residence time, sec. | 30 to 60 |

| Run No. | 1 | 2 | 3 | 4 | 5 | 6 | 7 |
|---|---|---|---|---|---|---|---|
| Theory of $I_2$ (based on: $C_6H_{14}+4I_2 \rightarrow C_6H_6+8HI$) | 0 | <0.0025 | 0.025 | 0.05 | 0.1 | 0.15 | 0.475 |
| $I_2$/n-hexane mole ratio | 0 | <0.01 | 0.1 | 0.2 | 0.4 | 0.6 | 1.9 |
| $I_2$, percent wt., based on n-hexane | 0 | 1–3 | 32 | 64 | 127 | 191 | 832 |
| Temperature, °C | 527 | 527 | 527 | 527 | 527 | 527 | 497 |
| n-Hexane reacted, percent | <1 | 25 | 39.6 | 40 | 40 | 50 | 58 |
| Equivalents (Percent of Reacted Hexane) | | | | | | | |
| n-Hexane conversion products: | | | | | | | |
| Benzene | 0 | <1 | 16 | 24 | 35 | 46 | 80 |
| $C_6$ olefinic products | 0 | <1 | 13 | 12 | 7 | 6 | 8 |
| Total $C_6$ products | 0 | <1 | 29 | 36 | 42 | 52 | 88 |
| n-Hexane cracking products: | | | | | | | |
| $C_1$ | | 8 | 1 | 1 | 1 | 1 | 0.3 |
| $C_2$ | | 29 | 11 | 9 | 10 | 9 | 1.2 |
| $C_3$ | | 24 | 32 | 33 | 20 | 21 | 3.5 |
| $C_4$ | | 13 | 22 | | 10 | 11 | 1.7 |
| $C_5$ | | 2 | 5 | | 6 | 4 | 0.1 |
| Total $C_1$–$C_5$ | | 76 | 71 | >43 | 47 | 46 | 6.8 |

Table 2 shows the conversion of n-hexane to benzene and to olefinic products of 6 carbon atoms per molecule, as well as to cracked products. The cracked products are expressed as equivalents of the reacted hexane. This means, for example, that if one hundred moles of hexane are reacted and the reaction product ultimately contains 12 moles of methane (carbon equivalent to 2 moles of hexane), these are reported as two equivalent percent based on the hexane.

It is seen that in run No. 1, in which no iodine was employed, essentially no hexane was converted. In run 2, employing between 1 and 3% by weight of iodine (less than 0.01 mole $I_2$ mole hexane) there was no benzene or $C_6$ olefin recovered; 25% of the hexane was converted; of this, 76% was recovered as cracked fragments. In run No. 3, charging 0.1 mole iodine per mole hexane, about 40% of the hexane reacted; the portion of reacted hexane which was converted to benzene and $C_6$-olefinic products was 29%, the two types being produced in approximately equal portions, and 71% of the reacted hexane was recovered as cracked fragments. With each further increase in iodine charged, the benzene production increased substantially and the selectivity to benzene increased even more because the yield of $C_6$-olefinic products decreased as did the yield of fragmentation products.

*Example II*

The following runs illustrate how the use of oxygen in accordance with the present invention permits one to recover much more butadiene from a mixture of n-butane and butene-1 with iodine than is possible without oxygen at otherwise equal reaction conditions. These runs were carried out by passing a mixture of equal parts n-butane and butene-1 and 580% by weight, based on the hydrocarbons, of vaporized iodine through a reaction zone consisting of an unobstructed quartz tube. No oxygen was added in run 1. In runs 2 and 3 oxygen was injected into the flowing reaction mixture at a point halfway between the reactor inlet and outlet. In run 2, the amount of oxygen was 0.07 mole per atom of total iodine charged and in run 3 it was 0.17 mole per atom. The conditions and results are summarized in Table 3.

TABLE 2

| Feed | Equal parts (mole) n=butane and butene=1. |
|---|---|
| Temperature | 500° C. |
| Pressure | 0 p.s.i.g. |
| Nominal residence time | 2 sec. |

| Run No. | 1 | 2 | 3 |
|---|---|---|---|
| $I_2$/Hydrocarbon, mole ratio | 1.3 | 1.3 | 1.3 |
| $I_2$, percent wt. based on hydrocarbon | 580 | 580 | 580 |
| $O_2$/total iodine (as $I_2$), mole ratio | 0 | 0.13 | 0.34 |
| Ratio: Moles $O_2$/atom I | 0 | 0.07 | 0.17 |
| Product (Basis: 100 moles Hydrocarbon Charged): | | | |
| $C_4H_{10}$ | 39.1 | 23.2 | 23.9 |
| $C_4H_8$ | 35.4 | 34.4 | 25.6 |
| $C_4H_6$ | 23.2 | 30.0 | 37.7 |
| $C_4$ unsaturated, as iodides [a] | ~2 | ~8 | ~8 |
| Total $C_4$'s, not including oxygenated compounds | ~99.7 | ~95.6 | ~95.2 |
| Oxygenated compounds and fragmentation products ($C_4$ equivalents) | ~0.3 | ~4.4 | ~4.8 |

[a] Estimated; iodide formation due to slight delay in separating $I_2$ and HI from hydrocarbon in reactor effluent.

It was found in these runs that the amount of butadiene produced increased from 23.2 mole percent of the hydrocarbon charged in run 1 to 30% in run 2 and 37.7% in run 3. At the same time, the loss to oxygenated and fragmentation products increased only slightly, from about 0.3% to values still below 5% ($C_4$ equivalent). Under carefully controlled conditions it is possible to reduce these losses.

*Example III*

The use of oxygen in accordance with the present invention to increase the utilization of iodine is further illustrated in the following runs. In these runs, n-hexane was converted to benzene and $C_6$ unsaturates by charging a vaporized feed mixture of hexane and iodine at essentially atmospheric pressure through an empty reaction tube maintained at a temperature in the range from 500° to 530° C. In run 1 no oxygen was used. In runs 2 and 3 oxygen was injected into the reactant stream at a point halfway between the reactor inlet and outlet. The amount of iodine employed in runs 1 and 2 was nearly the same, 549 and 531% wt. respectively, based on the hexane. In run 3 the amount of iodine (based on hexane) was about half that used in run 2 and the oxygen to iodine ratio was about tripled over run 2. The conditions and results are summarized in Table 4.

TABLE 4

| Feed | n-hexane | | |
|---|---|---|---|
| Temperature, °C | ca. 500 | 530 | 530 |
| Pressure, cm. Hg | 76 | 87 | 81 |
| Nominal Residence Time, sec | 37 | 3.9 | 5.1 |
| Theory of $I_2$ (based on: $C_6H_{14}+4I_2 \rightarrow C_6H_6 + 8HI$) | 0.465 | 0.45 | 0.225 |
| $I_2$/n-hexane, mole ratio | 1.86 | 1.8 | 0.9 |
| $I_2$, percent wt. based on n-hexane | 549 | 531 | 266 |
| $O_2$/total iodine (as $I_2$), mole ratio | 0 | 0.11 | 0.38 |
| Ratio: moles $O_2$/atom I | 0 | 0.06 | 0.19 |
| $O_2$/n-hexane, mole ratio | 0 | 0.20 | 0.34 |
| n-Hexane reacted (basis 100 moles charged) | 57.9 | 65.3 | 60.0 |
| Product (Basis 100 moles n-Hexane Reacted): | | | |
| Benzene | 79.8 | 78.8 | 65.6 |
| $C_6$ unsaturates | 8.0 | 8.3 | 8.9 |
| Product (Basis 100 moles n-Hexane Charged): | | | |
| Benzene | 46.2 | 51.5 | 39.3 |
| $C_6$ unsaturates | 4.6 | 5.4 | 5.3 |

In run No. 1, 0.465 theory of iodine (based on converting hexane to benzene) was charged. The theoretical benzene yield is, therefore, about 46.5 mole percent (based on the hexane charged). The actual yield was 46.2 mole percent of benzene and 4.6 mole percent of $C_6$ unsaturates. Essentially, therefore, the reaction proceeded quite cleanly and was carried to completion. In run 2, 0.45 theory of iodine was charged together with 0.06 mole of oxygen per atom of iodine; the oxygen was injected at a point where HI was present. Compared to run 1, the reaction temperature was raised from 500° to 530° C. and the contact time decreased from 37 seconds to 3.9 seconds. The theoretical benzene yield, based on iodine alone, is about 45 mole percent (calculated on the hexane charged); based on both iodine and oxygen, the theoretical benzene yield is 55 mole percent. The actual yield of 51.5 mole percent is substantially higher than that obtainable from iodine alone and approaches the theoretical based on iodine and oxygen. In run 3, the amount of iodine charged was dropped to 0.225 theory and the oxygen increased to 0.19 mole per atom of iodine. The conversion level of n-hexane was maintained in the range of that previously obtained. The theoretical yield of benzene based on iodine alone is about 22.5 mole percent and the theoretical yield based on iodine plus oxygen is 39.5 mole percent. The actual yield of 39.3 moles of benzene per 100 moles of hexane charged is greatly increased over the theoretical yield based on iodine alone and is substantially equivalent to that based on iodine plus oxygen. This increase is due to the addition of oxygen to reconvert HI to elemental iodine.

*Example IV*

The following runs illustrate the manner in which the conversion of a mixture of normal butane and butene-1 to butadiene is affected by increasing the iodine-to-hydrocarbon ratio from 0.016 to 1.2 moles/mole (540% by weight) while injecting 0.23 mole of oxygen per mole of hydrocarbon feed. The ratio of oxygen to iodine varied, therefore, from 7.2 to 0.095 mole oxygen per atom of iodine charged.

These runs were carried out by passing a stream of a vaporized mixture of equal parts of n-butane and butene-1 through an unobstructed reaction space maintained at a temperature of 550° C. and injecting at the inlet to the reaction zone a vaporized mixture of elemental iodine and oxygen. The reaction conditions are set out in Table 5.

The results are graphically illustrated in the drawing, in which butadiene yield, butane conversion, selectivity to butadiene, carbon monoxide yield, and cracked-products yield ($C_1$–$C_3$) are plotted as curves A through E, respectively. The iodine-to-hydrocarbon ratio is plotted as abscissa. The abscissa scale changes at 80% iodine to permit clear presentation of the complete set of data in a single figure.

Curve A shows the conversion to butadiene. This conversion is only about 7% when the amount of iodine added is about 7.5% by weight based on hydrocarbon feed. Conversion to butadiene rises to about 17% and stays at about that level for iodine charge ratios from about 10% to 100% wt. based on feed (about 0.022 to about 0.224 mole $I_2$/mole feed). As the amount of iodine charged increases beyond that point, the conversion to butadiene rises steadily and is still rising at an iodine ratio of about 540% wt. (1.21 moles per mole feed) where conversion is about 49%.

The shape of curve B, the conversion of butane, is similar to that of curve A. Part of the n-butane is converted to butenes and part to butadiene, and some to cracked products and oxygenated products. It is shown that the conversion of n-butane is zero when only about 7% by weight of iodine is added to the feed. All the butadiene formed under these conditions is from butene present in the charge mixture.

The conversion to undesired by-products is illustrated by curve D for carbon monoxide and curve E for fragments due to cracking ($C_1$ to $C_3$). Each of these curves rises steadily to peak at an iodine ratio of between 10 and 30% (0.025 to 0.067 mole/mole of feed) and then drops to a lower level.

Curve C shows the selectivity of the reaction for production of butadiene, i.e., the ratio of butadiene formed to the sum of butane and butene disappeared. This selectivity is about 50% at an iodine ratio of 7%, levels out at about 62% at iodine ratios between about 25% and 80% and then increases to 81 and 86% respectively at iodine ratios of about 300% and 540%.

*Example V*

A vaporous feed mixture of propane and elemental iodine at a mole ratio of iodine to propane of 0.86 was passed through a reaction zone at 1 atmosphere pressure and 550° C., at a nominal residence time of 36 seconds. 51% of the propane and 55% of the iodine reacted. On the basis of 100 moles of propane reacted, the product contained 93 moles of propylene.

By the addition of between 0.1 and 1 mole of oxygen per atom of active iodine species into the reaction mixture, at least part of the hydrogen iodide present is converted to elemental iodine. The equilibrium is thus upset and the conversion of propane to propylene is increased.

*Example VI*

A vaporous mixture of iodine and ethane in a mole ratio of iodine to ethane of 0.65 was passed through a reaction zone at a temperature of about 600° C. at a nominal residence time of 18 seconds. 40% of the ethane and about 60% of the iodine reacted, with a yield of at least 92 moles of ethylene per hundred moles of ethane reacted.

When between 0.1 and 1 mole of oxygen per atom of

TABLE 5

| Feed | Equal parts (mole) n-Butane and Butene-1 | | | | | | |
|---|---|---|---|---|---|---|---|
| Temperature, °C | 550 | 550 | 550 | 550 | 550 | 550 | 550 |
| Pressure, p.s.i.g | 0 | 0 | 0 | 0 | 0 | 0 | 0 |
| Nominal Residence Time, seconds | ~1 | ~1 | ~1 | ~1 | ~1 | ~1 | ~1 |
| $I_2$/Hydrocarbon, mole ratio | 1.2 | 0.76 | 0.28 | 0.11 | 0.054 | 0.039 | 0.016 |
| $I_2$, Percent w. based on hydrocarbon | 540 | 340 | 125 | 49 | 24 | 17 | 7 |
| $O_2$/total iodine (as $I_2$), mole ratio | 0.19 | 0.30 | 0.82 | 2.1 | 4.3 | 5.9 | 14.4 |
| Ratio: moles $O_2$/atom I | 0.095 | 0.15 | 0.41 | 1.1 | 2.2 | 3.0 | 7.2 |
| $O_2$/hydrocarbon, mole ratio | 0.23 | 0.23 | 0.23 | 0.23 | 0.23 | 0.23 | 0.23 | active iodine species is added to the flowing reaction mixture, hydrogen iodide is converted back to elemental iodine and the conversion of ethane to ethylene is increased.

*Example VII*

A vaporous mixture of elemental iodine and normal pentane at a mole ratio of iodine to pentane of 0.42 was passed through a reaction zone at 1 atmosphere pressure, a temperature of 500° C. and a nominal residence time of 8 seconds. 33% of the pentane and about 81% of the iodine reacted. On the basis of 100 moles n-pentane reacted, the product contained 88.4 moles of pentenes, 6.5 moles of pentadiene and small amounts of other hydrocarbons. By adding oxygen to the extent of between 0.1 and 1 mole per atom of active iodine species at the point of injection, the conversion of pentane to pentenes and pentadiene is substantially increased, the selectivity to pentadiene being increased over that found without the use of oxygen.

*Example VIII* n-Heptane, admixed with iodine in vapor phase, was passed through a reaction zone maintained at 545° C. at an iodine-to-heptane mole ratio of 0.64. At a point in the reactor at which the nominal residence time of the feed was 4.9 seconds, air was added to supply an amount of oxygen equal to 0.3 gram moles of oxygen per gram atom of iodine originally added. The resulting mixture was passed through a further part of the reactor for an additional nominal residence time of 2.7 seconds at 545° C. The active iodine species were then rapidly separated from the hydrocarbon product by absorbing them in a suitable solvent.

It was found that 60% of the n-heptane and 98% of the iodine was coverted in the reaction zone. About 34% of the heptane feed had been converted to aromatics—about 27% to toluene and about 7% to benzene.

When converting n-heptane with elemental iodine under otherwise equal conditions but without the addition of oxygen or air, only about 22% of the heptane is converted to aromatics under the most favorable conditions, compared to the 34% converted in the presence of oxygen added as described.

*Example IX*

A vaporous mixture of n-octane and iodine was passed through a reaction zone at 490° C. at a nominal residence time of 11 seconds. The mole ratio of iodine-to-octane was 2.3. 64% of the octane and about 99% of the iodine was converted. On the basis of 100 moles of hydrocarbon reacted, the product contained over 30% ethylbenzene, over 20% orthoxylene, about 33% toluene, about 8% benzene and about 5% of octenes. By adding a substantial amount of oxygen, not exceeding 1 mole per atom of active iodine species present at the point of addition the conversion of octane to aromatics is further substantially increased.

*Example X*

A vapor mixture of octene-1 and elemental iodine at an iodine-to-hydrocarbon mole ratio of 0.93 was passed through a reaction zone at 490° C. for a nominal residence time of 0.8 second. 55% of the hydrocarbon and about 100% of the iodine was converted. The reaction product contained, on the basis of 100 moles of octene reacted, 33% of xylene or ethylbenzene, 23.5% toluene, about 11% benzene, 17% octane and 3.4% $C_8$ diolefin or cycloolefin. By adding a substantial amount of oxygen not exceeding 1 mole of oxygen per atom of active iodine species present at the point of injection, the conversion of octene to aromatic hydrocarbons is further substantially increased.

*Example XI*

A mixture of 81% of 2,5-dimethylhexane and 19% of 2,5-dimethylhexene with elemental iodine in a mole ratio of 2.4 moles of iodine per mole of hydrocarbon was passed in vapor phase through a reaction zone at a temperature of 498° C. at a nominal residence time of 5 seconds. 63% of the hydrocarbon and about 99% of the iodine was converted. On the basis of 100 moles of hydrocarbon reacted, the product contained 96% of $C_8$-aromatics which was 99% para-xylene, 0.9% toluene and 0.1% benzene.

By adding a substantial amount of oxygen not exceeding 1 mole per atom of active iodine species present at the point of injection, the conversion of the hydrocarbons to para-xylene is further increased. Alternatively, when adding oxygen in the manner described, the same conversion can be maintained by reducing the amount of iodine charged, preferably to not less than 0.2 mole $I_2$/mole hydrocarbon, and injecting oxygen at a plurality of injection points in such a manner that the concentration of oxygen in the reaction mixture at each injection point does not exceed 1 mole per atom of active iodine species present.

The process of this invention is generally applicable to the conversion of what are here designated as "iodine-reactive" hydrocarbons to products having a higher carbon-to-hydrogen ratio.

In extensive studies it has been determined by the present inventors and co-workers that the following hydrocarbons are iodine-reactive and are, at proper reaction conditions, converted by contact with elemental iodine into the indicated more unsaturated reaction products, generally in reactions of very high selectivity.

Hydroaromatic alicyclic compounds can be converted to the corresponding aromatic compounds by dehydrogenation. Compounds containing an aliphatic chain of at least 6 non-quaternary carbon atoms can be converted to aromatics by dehydrocyclization, as can cyclic compounds having an aliphatic chain or aliphatic chains capable of closing a ring of six carbon atoms. Compounds having an aliphatic chain of 2 to 5 non-quaternary carbon atoms and compounds having a ring of 5 carbon atoms can be converted by dehydrogenation into compounds having a greater number of carbon-to-carbon double bonds. Certain more saturated compounds may also be converted to compounds having acetylenic triple bonds, e.g. ethane or ethene to acetylene. Compounds which have an aliphatic chain of at least 5 or 4 carbon atoms, including respectively, 1 or 2 quaternary carbon atoms and which have no chain of 6 non-quaternary carbon atoms are converted, by reaction including conversion of a quaternary to a non-quaternary carbon atom, into different compounds having the same carbon number as the feed, followed, if residence time is sufficient, by conversion of the latter compounds in accordance with their new structure, e.g. into aromatics.

The invention is, for example, particularly suitable for the following conversion reactions:

Ethane to ethylene and acetylene.
Ethylene to acetylene.
Propane to propylene and methylacetylene or allene.

Aliphatic compounds having from four to five contiguous non-quaternary carbon atoms in a chain to the corresponding olefins and diolefins, and particularly to conjugated diolefins. This includes the following conversions: n-Butane to 1-butene, 2-butene and 1,3-butadiene. 1-Butene or 2-butene to 1,3-butadiene. n-Pentane to 1-pentene, 2-pentene and 1,3-pentadiene. 1-Pentene or 2-pentene to 1,3-pentadiene. Isopentane to 3-methyl-1-butene, 3-methyl-2-butene, 2-methyl-1-butene and isoprene.

Aliphatic hydrocarbons having a chain of at least six contiguous non-quaternary carbon atoms and having from six to 16 carbon atoms per molecule to aromatic hydrocarbons. This includes the following conversions: n-Hexane to benzene. Straight chain hexenes to benzene. n-Heptane to toluene and a small amount of benzene.

Straight chain heptenes to toluene and a small amount of benzene. Monomethylhexanes to toluene. Monomethylhexenes to toluene. n-Octane to aromatics predominating in ethylbenzene and ortho-xylene. Straight chain octenes to aromatics predominating in ethylbenzene and ortho-xylene. Monomethylheptanes or monomethylheptenes to aromatics predominating in xylenes. Dimethylhexanes (DMH) other than geminal, i.e., 2,3-DMH, 2,4-DMH, 2,5-DMH and 3,4-DMH, as well as corresponding monoolefins, to xylenes; thus: 2,3-DMH and 3,4-DMH give ortho-xylene; 2,4-DMH gives meta-xylene and 2,5-DMH gives para-xylene. $C_{10}$ saturates containing no quaternary carbon atoms, and the corresponding olefins, to substituted monocyclic aromatics with predominantly saturated side chains. The following are illustrative: n-Decane to n-butylbenzene, propyltoluene, diethylbenzene, propylbenzene, ethylbenzene, toluene and benzene plus some of the corresponding compounds with side chain unsaturation. 5-methylnonane to n-butylbenzene, propyltoluene, 1,4-dimethyl-2-ethylbenzene (2-ethyl-p-xylene), m-ethyltoluene, p-xylene and toluene plus some of the corresponding compounds with side chain unsaturation.

Non-hydroaromatic cycloparaffins and cycloolefins to corresponding cycloolefins and cyclodiolefins. For example: Cyclopentane to cyclopentene and cyclopentadiene-1,3. Cyclopentene to cyclopentadiene-1,3. Methylcyclopentane to 1-methyl-cyclopentene, 3-methylcyclopentene, 4-methylcyclopentene, 1-methylcyclopentadiene-1,3, 2-methyl-cyclopentadiene-1,3 and 5-methylcyclopentadiene-1,3. Other methyl substituted cyclopentanes and cyclopentenes are similarly converted.

Hydroaromatic naphthenes and cycloolefins to corresponding aromatics. For example: Cyclohexane to benzene. Methylcyclohexane to toluene. Ethylcyclohexane to ethylbnezene. 1,2-dimethylcyclohexane to xylene. 1,3-dimethylcyclohexane to m-xylene. 1,4-dimethylcyclohexane to p-xylene.

Aromatics with alkyl side chains of 2 or more carbon atoms, especially those with 2 to 3 carbon atoms in the chain, to aromatics having unsaturated side chains. For example: Ethylbenzene to styrene. n-Propylbenzene to $\beta$-methyl-styrene. Isopropylbenzene to $\alpha$-methyl-styrene.

Although the reaction of hydrocarbons with iodine is highly selective, differences have been observed between various hydrocarbons, both in the rate of reaction and in the selectivity to a particular compound. Thus, the rate at which olefins are converted to compounds having a higher degree of unsaturation, either diolefins or other olefinic compounds or aromatics, is considerably greater, often by a factor of 10 or more, than the rate of reaction of paraffins of the identical skeleton at otherwise equal conditions. It has also been found that the ideal length of the chain of contiguous non-quaternary carbon atoms in the aromatization of aliphatic compounds by dehydrocyclization is from 6 to 7 carbon atoms for the most efficient conversion to aromatics. When longer chains are aromatized the product contains not only aromatics of the same number of carbon atoms but also appreciable amounts of lower aromatics, formed by splitting off of short fragments, e.g., methyl or ethyl groups. Except for this latter effect of losing short fragments from aromatics, the reactions of the present invention are highly selective in producing a product having the same number of carbon atoms as the charge hydrocarbon. Thus, the present invention is not concerned with promotion of the cracking of hydrocarbons.

The feed charged to the reaction mixture may be a pure iodine-reactive hydrocarbon or it may be an iodine-reactive hydrocarbon in admixture with different iodine-reactive hydrocarbons or it may be an iodine-reactive hydrocarbon in admixture with inert compounds. An inert compound, for example, is benzene or naphthalene, which is not converted in any manner under the conditions of this invention.

The oxygen may be employed as pure oxygen gas or diluted, e.g. air or oxygen diluted with carbon dioxide or other inert gases.

The iodine is preferably charged as elemental iodine. At least part of the iodine requirement may be added as hydrogen iodide, in which case the oxygen serves to generate elemental iodine therefrom. Iodine may be added in the form of a non-metallic iodide which decomposes at the reaction conditions to liberate iodine. Alkyl iodides, for example, may be used to supply iodine. There is ordinarily no advantage in this. Regardless of how the iodine is added, the ratio of moles of oxygen per atom of iodine, previously discussed, is calculated on the iodine present in any active species, i.e. in any form which becomes available as elemental iodine, iodine atoms, or hydrogen iodide at the reaction conditions in the presence of oxygen.

The process of the present invention is suitably carried out in a manner already described by means of the examples. In such an operation, vaporized organic iodine-reactive feed hydrocarbon and elemental iodine, preferably heated to a temperature approaching that desired to be maintained in the reaction, are passed continually to the reaction zone which is suitably provided by an otherwise empty reaction vessel. In a preferred operation, the amount of oxygen added to the reaction is also sufficient to supply the total heat required for the endothermic reaction of the iodine-reactive feed and iodine, so that the reactor may be operated in adiabatic manner. Such a reactor may suitably be made of quartz, or on a larger scale it may be a metal vessel lined with corrosion resistant metal, such as platinum, or heat- and corrosion-resistant ceramic material such as acid resistant bricks. Oxygen is injected into the reaction vessel, preferably at one or more injection points, e.g. one, two, three or sometimes more. The mixture passes through the reactor at such a rate that the residence time is within the previously defined range.

If the reaction product contains highly reactive materials such as diolefins it is preferred to contact the reactor effluent quickly with a solvent for iodine and hydrogen iodide, such as, for example, an aqueous solution of hydrogen iodide, or aqueous caustic. The solvent is preferably selected to be such that it will dissolve the hyrdogen iodide and iodine without converting them to products from which either hydrogen iodide or elemental iodine is difficult to regenerate. The solvent is also selected such that it does not react substantially with the feed compound, intermediates and product compounds. After elemental iodine and hydrogen iodide have been removed from the hydrocarbon product, the latter is worked up in conventional manner, depending on the material to be recovered.

We claim as our invention:

1. A process for converting an iodine-reactive hydrocarbon by reaction with a reactive proportion of elemental iodine into a hydrocarbon having a higher carbor-to-hydrogen ratio which comprises adding to a mixture comprising said first hydrocarbon and hydrogen iodide in vapor phase at a temperature in excess of 450° C. an amount of free oxygen not exceeding 1 molecular weight proportion per atomic weight proportion of iodine in all active iodine species present at the point of addition to produce a mixture comprising said first hydrocarbon and at least 0.2 atomic weight proportion of iodine per mole of hydrocarbon, and subjecting the latter mixture to a temperature of at least 450° C. for a nominal residence time of from 0.01 second to 5 minutes in vapor phase to convert at least part of said first hydrocarbon and iodine to said second hydrocarbon and hydrogen iodide.

2. A process according to claim 1 in which the mixture comprising said first hydrocarbon and hydrogen iodide results from contacting said first hydrocarbon with elemental iodine at conditions for converting part thereof to said second hydrocarbon and hydrogen iodide.

3. A process according to claim 1 in which the steps of conversion of the mixture comprising said first hydrocarbon and elemental iodine and conversion of hydrogen iodide by oxidation are repeated in succession.

4. A process according to claim 1 in which the conversion of the mixture comprising said first hydrocarbon and elemental iodine and the conversion of hydrogen iodide by oxidation take place simultaneously in a single reaction zone.

5. A process for producing unsaturated hydrocarbons which comprises passing into a reaction zone at a temperature in excess of 450° C. an iodine-reactive hydrocarbon and at least 0.1 mole of iodine per mole of said iodine-reactive hydrocarbon, causing the resulting mixture to flow through the reaction zone in vapor phase, adding to the flowing mixture in said reaction zone, at at least one point, elemental oxygen in a controlled amount such that the oxygen present in the mixture, following addition, does not exceed 1 molecular weight proportion per atomic weight proportion of iodine in all active iodine species present, withdrawing the reacted mixture from the reaction zone after a nominal residence time of no more than about 1 minute and separating and recovering an unsaturated hydrocarbon product.

6. A process according to claim 5 in which said unsaturated hydrocarbon product contains olefinic double bonds and in which the amount of elemental oxygen added at each injection point is in the range between 0.025 and 0.4 molecular weight proportion of oxygen per atomic weight proportion of iodine present at the point of oxygen addition.

7. A process according to claim 6 in which said iodine-reactive hydrocarbon has no less than 2 and no more than 5 contiguous non-quaternary carbon atoms in a chain.

8. A process according to claim 5 in which said unsaturated hydrocarbon product is an aromatic hydrocarbon and in which the amount of elemental oxygen added at each injection point is in the range between 0.025 and 0.5 molecular weight proportion of oxygen per atomic weight proportion of iodine present at the point of oxygen addition.

9. A process according to claim 8 in which said iodine-reactive hydrocarbon has a chain of at least 6 contiguous non-quaternary carbon atoms.

10. A process for producing butadiene which comprises passing into a reaction zone at least one normal aliphatic hydrocarbon having four carbon atoms per molecule and no more than one double bond and at least 0.2 mole of elemental iodine per mole of hydrocarbon, causing the resulting mixture to flow through the reaction zone in vapor phase, adding to the flowing mixture in said reaction zone, at at least one injection point, elemental oxygen in a controlled amount such that the oxygen present in the mixture, following addition, does not exceed one molecular weight proportion per atomic weight proportion of iodine in all active iodine species present, maintaining in said reaction zone a temperature in the range between 450° and 750° C., withdrawing the reacted mixture from said reaction zone at said reaction temperature after a nominal residence time in the range between 0.01 and 10 seconds, immediately removing the reactive iodine species from admixture with hydrocarbons in said reaction mixture and recovering butadiene from the hydrocarbons.

11. A process for producing aromatic hydrocarbons which comprises passing into a reaction zone at least one aliphatic hydrocarbon having at least 6 contiguous non-quaternary carbon atoms in a chain and at least 0.2 mole of elemental iodine per mole of hydrocarbon, causing the resulting mixture to flow through the reaction zone in vapor phase, adding to the flowing mixture in said reaction zone at at least one injection point, elemental oxygen in a controlled amount such that the oxygen present in the mixture, following addition, does not exceed one molecular weight proportion of oxygen per atomic weight proportion of iodine in all active iodine species present, maintaining in said reaction zone a temperature in the range between 450° and 650° C., withdrawing the reaction mixture from said reaction zone after a nominal residence time in the range between 0.01 and about 60 seconds, and recovering aromatic hydrocarbon from said mixture.

12. A process for the conversion of an iodine-reactive hydrocarbon by reaction with a reactive proportion of elemental iodine to produce hydrogen iodide and a hydrocarbon having a higher carbon-to-hydrogen ratio which comprises contacting in a reaction zone in vapor phase at a temperature in excess of 450° C. for a nominal residence time of from 0.01 second to 5 minutes a mixture comprising said first hydrocarbon, hydrogen iodide and an amount of oxygen in the range between 0.025 and 1 mole of oxygen per atomic weight proportion of iodine in all active iodine species present in said mixture, the amount of iodine in said active iodine species being at least 0.2 atomic weight proportion per mole of hydrocarbon, whereby elemental iodine is regenerated from hydrogen iodide and the reaction of the resulting iodine and said first hydrocarbon results in said second hydrocarbon and hydrogen iodide, withdrawing the reacted mixture from the reaction zone and separating and recovering a product comprising said second hydrocarbon.

References Cited in the file of this patent

UNITED STATES PATENTS

| | | |
|---|---|---|
| 1,925,421 | Van Peski | Sept. 5, 1933 |
| 2,259,195 | Baehr et al. | Oct. 14, 1941 |
| 2,315,499 | Cantzler et al. | Apr. 6, 1943 |
| 2,327,174 | Cass | Aug. 17, 1943 |
| 2,343,108 | Cass | Feb. 29, 1944 |

FOREIGN PATENTS

| | | |
|---|---|---|
| 849,804 | France | Aug. 28, 1939 |